US012719566B2

United States Patent
(12) United States Patent
Zhu

(10) Patent No.: US 12,719,566 B2
(45) Date of Patent: Aug. 25, 2026

(54) DATA TRANSMISSION METHOD AND APPARATUS, AND STORAGE MEDIUM

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 329 days.

(21) Appl. No.: 18/257,781

(22) PCT Filed: Dec. 16, 2020

(86) PCT No.: PCT/CN2020/136902
§ 371 (c)(1),
(2) Date: Jun. 15, 2023

(87) PCT Pub. No.: WO2022/126443
PCT Pub. Date: Jun. 23, 2022

(65) Prior Publication Data

US 2024/0106529 A1 Mar. 28, 2024

(51) Int. Cl.
*H04B 7/00* (2006.01)
*H04B 7/0408* (2017.01)
*H04B 7/185* (2006.01)

(52) U.S. Cl.
CPC ....... *H04B 7/18519* (2013.01); *H04B 7/0408* (2013.01); *H04B 7/18513* (2013.01)

(58) Field of Classification Search
CPC .............. H04B 7/18519; H04B 7/0408; H04B 7/18513; H04B 7/185; H04W 72/04
See application file for complete search history.

(56) References Cited

U.S. PATENT DOCUMENTS

2016/0323800 A1* 11/2016 Ulupinar ............ H04B 7/18541
2017/0099120 A1* 4/2017 Damnjanovic ....... H04L 1/1822
2017/0367019 A1 12/2017 Schultz et al.
2022/0095179 A1* 3/2022 Qiao ...................... H04B 7/185
2023/0246707 A1* 8/2023 Zhu .................... H04B 7/18513 370/316
2024/0106529 A1* 3/2024 Zhu ....................... H04W 72/04

FOREIGN PATENT DOCUMENTS

CN 103428782 A 12/2013
CN 106817783 A 6/2017
CN 109257786 A 1/2018
CN 108112281 A 6/2018
CN 110582094 A 12/2019
CN 111937325 A 11/2020

OTHER PUBLICATIONS

Combined Chinese Office Action and Search Report issued Aug. 9, 2024 in Chinese Patent Application No. 202080003970.0 with English translation, 31 pgs.
International Search Report issued Jun. 30, 2021, in PCT/CN2020/136902, filed on Dec. 16, 2020, 2 pages.

* cited by examiner

*Primary Examiner* — Md K Talukder
(74) *Attorney, Agent, or Firm* — Oblon, McClelland, Maier & Neustadt, L.L.P.

(57) ABSTRACT

A data transmission method includes: in response to determining that data transmission performed with a terminal by means of a first beam has not ended, and the first beam is unable to continue to provide a service for the terminal, determining a second beam; and switching to the second beam.

14 Claims, 10 Drawing Sheets

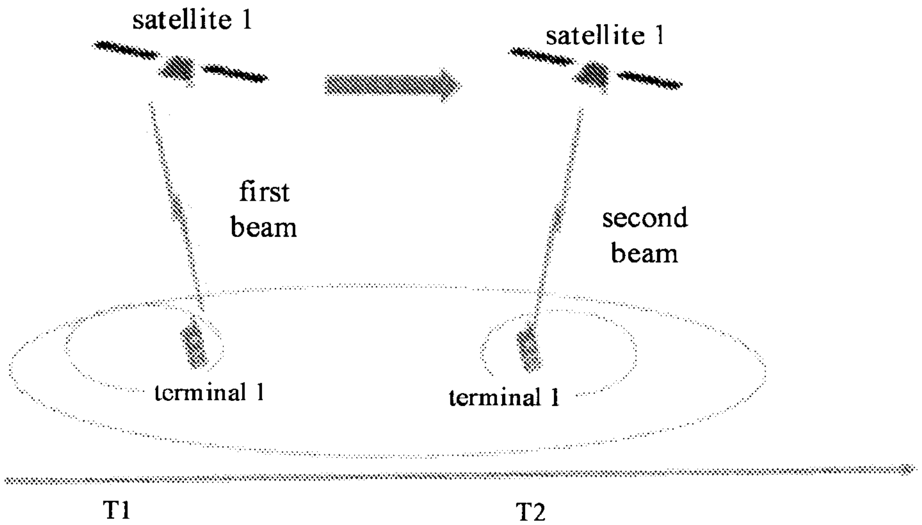
FIG. 2B
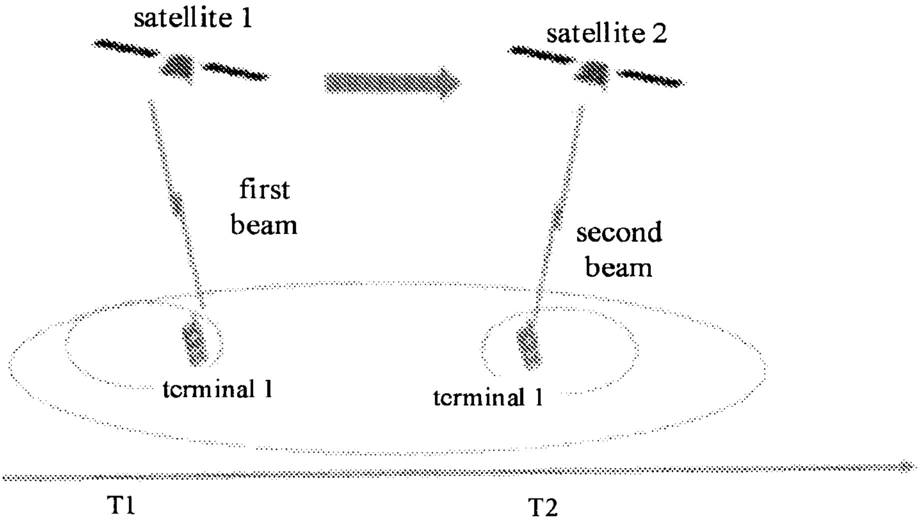
FIG. 2C
sending data information of data to be transmitted
301
FIG. 3

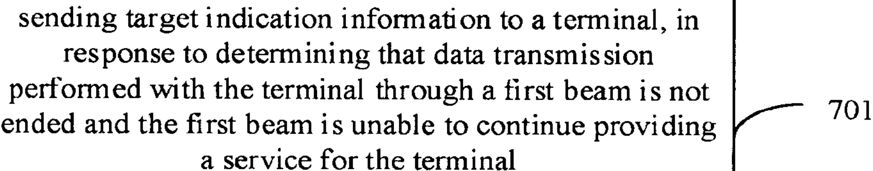
FIG. 7
sending association information to the terminal
801
FIG. 8
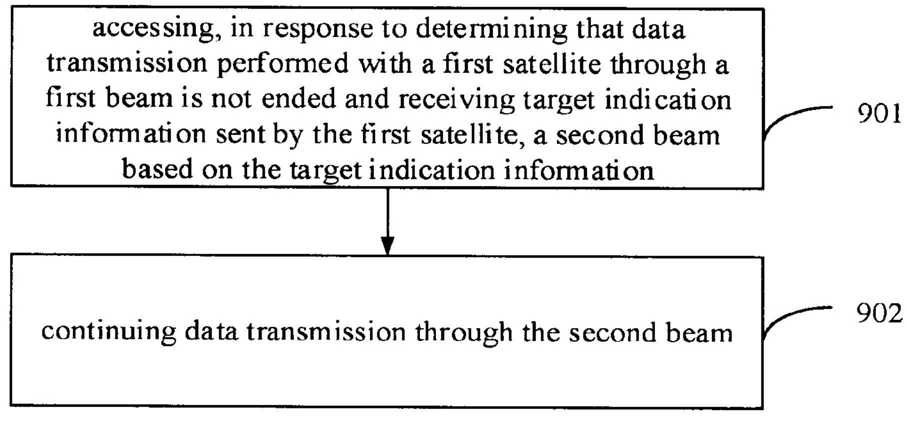
FIG. 9
receiving association information sent by the first satellite
1001
FIG. 10 accessing the second beam within a time period indicated by the duration indication information

1201 receiving a second transmission parameter sent by a second satellite corresponding to the second beam

1301 continuing data transmission through the second beam based on the second transmission parameter

1302 continuing, in response to determining that data transmission performed with a first satellite through a first beam is not ended and receiving updated transmission indication information sent by the first satellite, data transmission with the first satellite through the first beam based on the updated transmission indication information
1601
FIG. 16
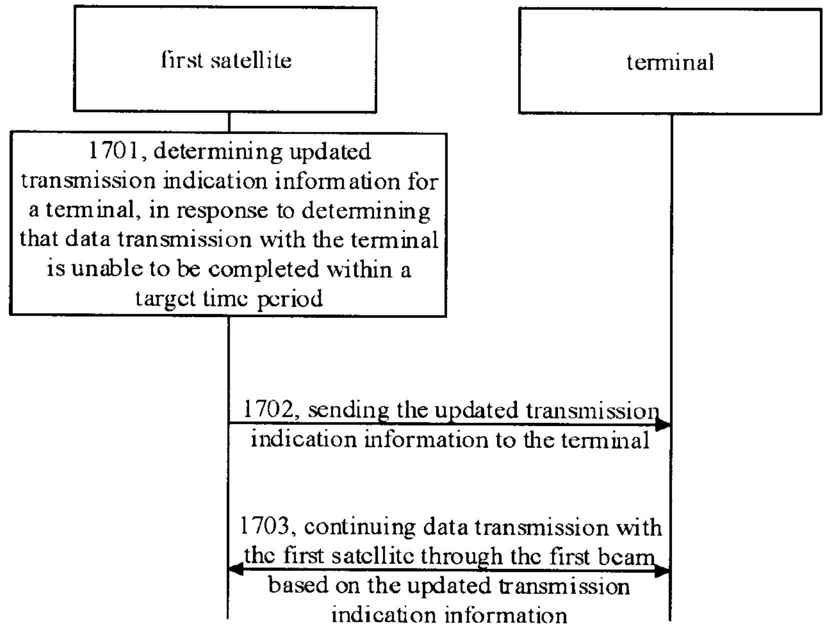
FIG. 17
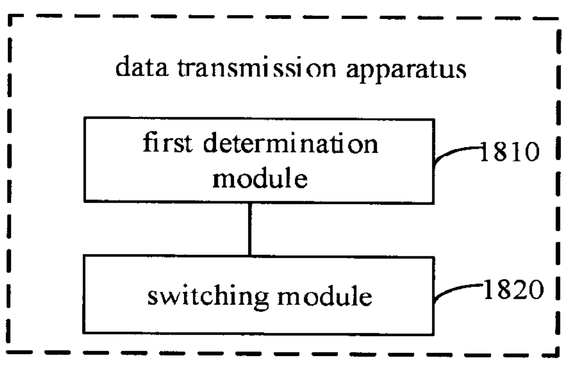
FIG. 18

DATA TRANSMISSION METHOD AND APPARATUS, AND STORAGE MEDIUM

CROSS REFERENCE TO RELATED APPLICATIONS

The present application is a U.S. National Stage of International Application No. PCT/CN2020/136902, filed on Dec. 16, 2020, the contents of which are incorporated herein by reference in their entireties for all purposes.

BACKGROUND

Technical Field

The disclosure relates to the communication field, in particular to a data transmission method and apparatus, and storage medium.

Description of the Related Art

In the research of wireless communication technology, satellite communication is considered as an important aspect of the development of wireless communication technology in the future. Satellite communication refers to the communication carried out by the radio communication device on the ground using satellites as relays. The satellite communication system consists of a satellite part and a ground part. The characteristics of satellite communication are: the communication range is large; communication can be carried out between any two points as long as it is within the range covered by radio waves emitted by satellites; it is not susceptible to land disasters (the reliability is high). Satellite communication, as a supplement to the current terrestrial cellular communication system, can have the following advantages. Firstly, it can realize extended coverage. For areas that cannot be covered by the current cellular communication system or areas have high coverage cost, such as oceans, deserts, remote mountainous areas, etc., satellite communication can solve the communication problem. Secondly, emergency communication can be carried out. For example, under the condition that the infrastructure of cellular communication is unavailable in extreme cases of disasters such as earthquakes, the communication connection can be quickly established by using satellite communication. In addition, it can also provide industry applications, for example, as for delay-sensitive services of long-distance transmission, the delay of service transmission may be reduced by means of satellite communication.

It can be predicted that in the future wireless communication system, the satellite communication system and the cellular communication system on land will gradually realize the deep integration, and truly realize the intelligent connection of all things.

SUMMARY

Embodiments of the present disclosure provide a data transmission method and apparatus, and storage medium.

According to a first aspect of the present disclosure, there is provided a data transmission method, applied to a first satellite, including determining, in response to determining that data transmission performed with a terminal through a first beam is not ended and the first beam is unable to continue providing a service for the terminal, a second beam for continuing data transmission with the terminal, and switching to the second beam.

According to a second aspect of the present disclosure, there is provided a data transmission method, applied to a terminal, including stopping, in response to receiving duration indication information for indicating a data transmission interruption duration, data interaction with a first satellite within a time period indicated by the duration indication information.

According to a third aspect of the present disclosure, there is provided a data transmission method, applied to a first satellite, including sending target indication information to a terminal, in response to determining that data transmission performed with the terminal through a first beam is not ended and the first beam is unable to continue providing a service for the terminal, wherein the target indication information is used for indicating the terminal to access a second beam.

According to a fourth aspect of the present disclosure, there is provided a data transmission method, applied to a terminal, including accessing, in response to determining that data transmission performed with a first satellite through a first beam is not ended and receiving target indication information sent by the first satellite, a second beam based on the target indication information, and continuing data transmission through the second beam.

According to a fifth aspect of the present disclosure, there is provided a data transmission method, applied to a first satellite, including determining updated transmission indication information for a terminal, in response to determining that data transmission with the terminal is unable to be completed within a target time period, wherein the target time period is a time period for providing a service for the terminal through the first beam, and the updated transmission indication information is used for the terminal to complete data transmission within the target time period, and sending the updated transmission indication information to the terminal.

According to a sixth aspect of the present disclosure, there is provided a data transmission method, applied to a terminal, including continuing, in response to determining that data transmission performed with a first satellite through a first beam is not ended and receiving updated transmission indication information sent by the first satellite, data transmission with the first satellite through the first beam based on the updated transmission indication information, wherein the updated transmission indication information is used for the terminal to complete data transmission within a target time period, and the target time period is a time period that the first satellite provides a service for the terminal through the first beam.

According to a seventh aspect of the present disclosure, there is provided a data transmission apparatus, applied to a first satellite, including a first determination module configured to determine, in response to determining that data transmission performed with a terminal through a first beam is not ended and the first beam is unable to continue providing a service for the terminal, a second beam for continuing data transmission with the terminal, and a switching module configured to switch to the second beam.

According to an eighth aspect of the present disclosure, there is provided a data transmission apparatus, applied to a terminal, including a first execution module configured to stop, in response to receiving duration indication information for indicating a data transmission interruption duration, data interaction with a first satellite within a time period indicated by the duration indication information.

According to a ninth aspect of the present disclosure, there is provided a data transmission apparatus, applied to a first satellite, including a first sending module configured to send target indication information to a terminal, in response to determining that data transmission performed with the terminal through a first beam is not ended and the first beam is unable to continue providing a service for the terminal, wherein the target indication information is used for indicating the terminal to access a second beam.

According to a tenth aspect of the present disclosure, there is provided a data transmission apparatus, applied to a terminal, including a second execution module configured to access, in response to determining that data transmission performed with a first satellite through a first beam is not ended and receiving target indication information sent by the first satellite, a second beam based on the target indication information, and a first data transmission module configured to continue data transmission through the second beam.

According to a eleventh aspect of the present disclosure, there is provided a data transmission apparatus, applied to a first satellite, including a second determination module configured to determine updated transmission indication information for a terminal, in response to determining that data transmission with the terminal is unable to be completed within a target time period, wherein the target time period is a time period for providing a service for the terminal through the first beam, and the updated transmission indication information is used for the terminal to complete data transmission within the target time period, and a second sending module configured to send the updated transmission indication information to the terminal.

According to a twelfth aspect of the present disclosure, there is provided a data transmission apparatus, applied to a terminal, including a second data transmission module configured to continue, in response to determining that data transmission performed with a first satellite through a first beam is not ended and receiving updated transmission indication information sent by the first satellite, data transmission with the first satellite through the first beam based on the updated transmission indication information, wherein the updated transmission indication information is used for the terminal to complete data transmission within a target time period, and the target time period is a time period that the first satellite provides a service for the terminal through the first beam.

According to a thirteenth aspect of the present disclosure, there is provided a non-transitory computer-readable storage medium, wherein the storage medium stores a computer program for performing the data transmission method of any one of the above first aspect, the third aspect or the fifth aspect.

According to a fourteenth aspect of the present disclosure, there is provided a non-transitory computer-readable storage medium, wherein the storage medium stores a computer program for performing the data transmission method of any one of the above second aspect, the fourth aspect or the sixth aspect.

According to a fifteenth aspect of the present disclosure, there is provided a data transmission apparatus, including a processor and a memory for storing instructions executable by the processor. The processor being configured to perform the data transmission method of any one of the above first aspect, the third aspect or the fifth aspect.

According to a sixteenth aspect of the present disclosure, there is provided a data transmission apparatus, including a processor and a memory for storing instructions executable by the processor. The processor being configured to perform the data transmission method of any one of the above second aspect, the fourth aspect or the sixth aspect.

It should be understood that the above general description and the following detailed description are only exemplary and explanatory and do not limit the present disclosure.

BRIEF DESCRIPTION OF THE DRAWINGS

The accompanying drawings herein are incorporated into and form part of the specification, illustrate example embodiments in accordance with the present disclosure and are used in conjunction with the specification to explain the principles of embodiments of the disclosure.

FIG. 2B is a schematic diagram of a data transmission scenario shown according to another example embodiment.

FIG. 2C is a schematic diagram of a data transmission scenario shown according to another example embodiment.

FIG. 3 is a flow diagram of a data transmission method shown according to another example embodiment.

FIG. 7 is a flow diagram of a data transmission method shown according to another example embodiment.

FIG. 8 is a flow diagram of a data transmission method shown according to another example embodiment.

FIG. 9 is a flow diagram of a data transmission method shown according to another example embodiment.

FIG. 10 is a flow diagram of a data transmission method shown according to another example embodiment.

FIG. 16 is a flow diagram of a data transmission method shown according to another example embodiment.

FIG. 17 is a flow diagram of a data transmission method shown according to another example embodiment.

FIG. 18 is a block diagram of a data transmission apparatus shown according to an example embodiment.

DETAILED DESCRIPTION OF THE PREFERRED EMBODIMENTS

Example embodiments will be described herein in detail, examples of which are represented in the accompanying drawings. Where the following description relates to the accompanying drawings, the same numerals in the different accompanying drawings indicate the same or similar elements, unless otherwise indicated. The implementations described in the following example embodiments do not represent all implementations consistent with the present disclosure. Rather, they are only examples of apparatuses and methods that are consistent with some aspects of the present disclosure as detailed in the appended claims.

The terms used in this disclosure is for the purpose of describing particular embodiments only and is not intended to limit the present disclosure. The singular forms of "a", "said" and "the" as used in this disclosure and the appended claims are also intended to include plural forms, unless the context clearly indicates other meanings. It should also be understood that the term "and/or" as used herein refers to and encompasses any or all possible combinations of one or more of the associated listed items.

It should be understood that while the terms first, second, third, etc. may be used in this disclosure to describe various information, such information should not be limited to these terms. These terms are used only to distinguish information of the same type from one another. For example, without departing from the scope of the present disclosure, first information may also be referred to as second information, and similarly, second information may also be referred to as first information. Depending on the context, for example, the word "if" as used here may be interpreted as "at" or "when" or "in response to determining".

Figure 1:
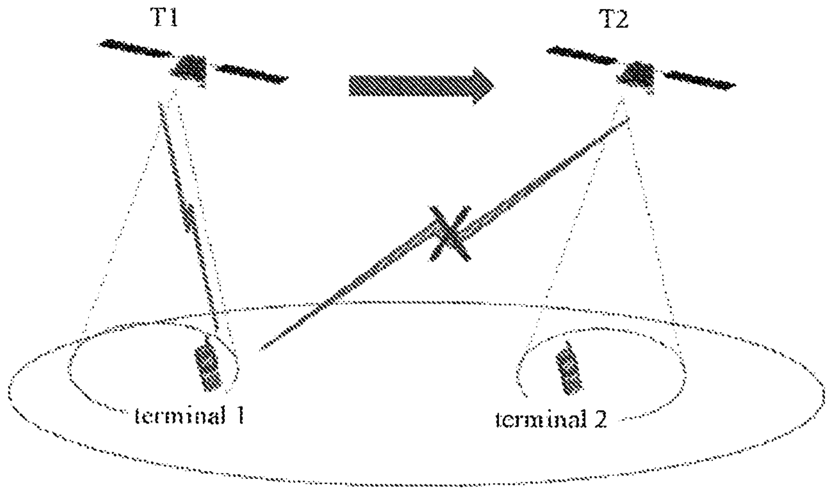
FIG. 1 is a schematic diagram of a data transmission scenario shown according to an example embodiment.

In the scenario of satellite communication, especially in the case of the moving beam, the service time of a single beam is limited, which may not guarantee the data transmission process required by the terminal. For example, as shown in FIG. 1, the satellite provides a service for the terminal 1 at time T1, but at time T2, the satellite cannot continue providing the service for the terminal 1 due to the movement of the satellite. If the terminal 1 sets repetitive data transmission including but not limited to repetitive data sending and/or repetitive data receiving, data transmission interruption will occur.

The present disclosure provides a plurality of data transmission schemes, which can ensure the reliability of data transmission in a satellite communication system.

It should be noted that in the scheme provided by the present disclosure, the deployment position of the base station is not limited, and the base station can be deployed on the satellite to interact with the terminal through the satellite, or the base station can be deployed on the ground, the satellite acts as a relay to realize the interaction between the base station and the terminal, which is not limited by the present disclosure.

It may be understood that, when the base station is deployed on the satellite and switched to the beam of a new satellite to continue providing a service for the terminal by beam switching, the base station for data interaction with the terminal is a different base station deployed on a different satellite. When the base station is deployed on the ground and switched to the beam of a new satellite to continue providing a service for the terminal by beam switching, the base station for data interaction with the terminal may also be the same base station deployed on the ground. Other situations should also fall within the scope of protection of this disclosure.

In the first scheme, the new service beam is directly switched to, without informing the terminal side.

Figure 2A:
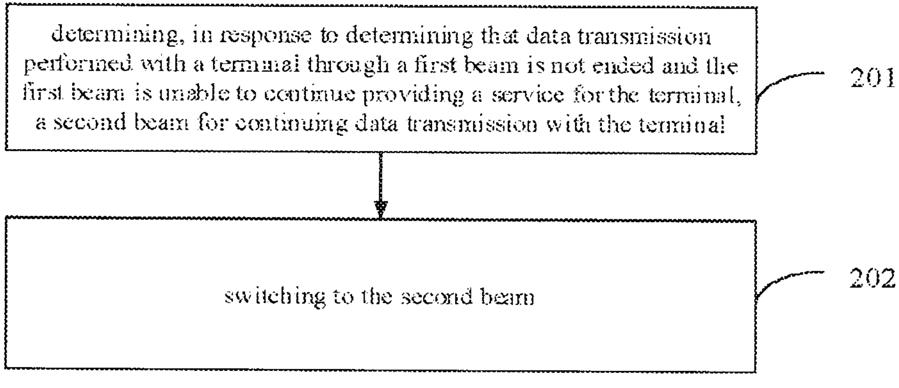
FIG. 2A is a flow diagram of a data transmission method shown according to an example embodiment.

An embodiment of the present disclosure provides a data transmission method. Referring to FIG. 2A, FIG. 2A is a flowchart of a data transmission method according to an embodiment, which can be applied to a first satellite. The method can include the following steps.

In step 201, in response to determining that data transmission performed with a terminal through a first beam is not ended and the first beam is unable to continue providing a service for the terminal, a second beam for continuing data transmission with the terminal is determined.

In the embodiment of the present disclosure, according to the ephemeris information of the first satellite itself and other satellites, including but not limited to the information of moving speed, moving direction, etc., the first satellite can determine the beam that can provide a service for the terminal after the service period of the first beam providing a service for the terminal ends, that is, determine the second beam. The second beam may be a beam from the first satellite that is different from the first beam, or the second beam may be a beam from a second satellite that is different from the first satellite, which is not limited in this disclosure.

In step 202, the second beam is switched to.

In the embodiment of the present disclosure, if the second beam comes from the first satellite, the first satellite can switch the first beam to the second beam and continue data transmission with the terminal through the second beam. For example, as shown in FIG. 2B, at time T1, the satellite 1 provides a service for the terminal 1 through the first beam, and at time T2, the first beam cannot continue providing a service for the terminal 1, so the first satellite performs beam switching, and the second beam from the satellite 1 continues to provide a service for the terminal 1.

Alternatively, the first satellite may switch to a second beam from the second satellite, and the second satellite continues data transmission with the terminal through the second satellite. For example, as shown in FIG. 2C, at time T1, the satellite 1 provides the service for terminal 1 through the first beam, and at time T2, the first beam of the satellite 1 cannot continue providing the service for the terminal 1, and other beams of the satellite 1 cannot continue providing the service for the terminal either, so the second beam can be switched to, and the satellite 2 continues to provide a service for the terminal 1 through the second beam.

In the above embodiment, the first satellite can determine a second beam to continue data transmission with the terminal under the condition that the data transmission with the terminal through the first beam is not ended but the first beam is unable to continue providing a service for the terminal, so as to switch to the second beam. In the satellite communication system, the reliability of data transmission is ensured.

In some embodiments, reference is made to FIG. 3, which is a flowchart of a data transmission method according to an embodiment, including the following step.

In step 301, data information of data to be transmitted is sent.

The data to be transmitted is data needed to be transmitted in a case that the second satellite continues data transmission with the terminal, including but not limited to the data that the second satellite needs to send to the terminal and/or the data that the terminal needs to upload to the second satellite.

In an embodiment of the present disclosure, the first satellite may send data information to the second satellite if it is necessary to continue data transmission with the terminal by the second beam from the second satellite.

In an example, the first satellite may directly send data information of data to be transmitted to the second satellite through an inter-satellite link between the first satellite and the second satellite.

In another example, the first satellite may send data information of the data to be transmitted to the ground station, and the ground station forwards it to the second satellite.

The above is only an example illustration, and other ways of providing data information of data to be transmitted to the second satellite should fall within the protection scope of the present disclosure.

In the above embodiment, the first satellite can provide the data needed to be transmitted when the second satellite continues data transmission with the terminal to the second satellite, so that the second satellite continues data transmission with the terminal, thus ensuring the reliability of data transmission in the satellite communication system.

Figures 4, 5, 6:
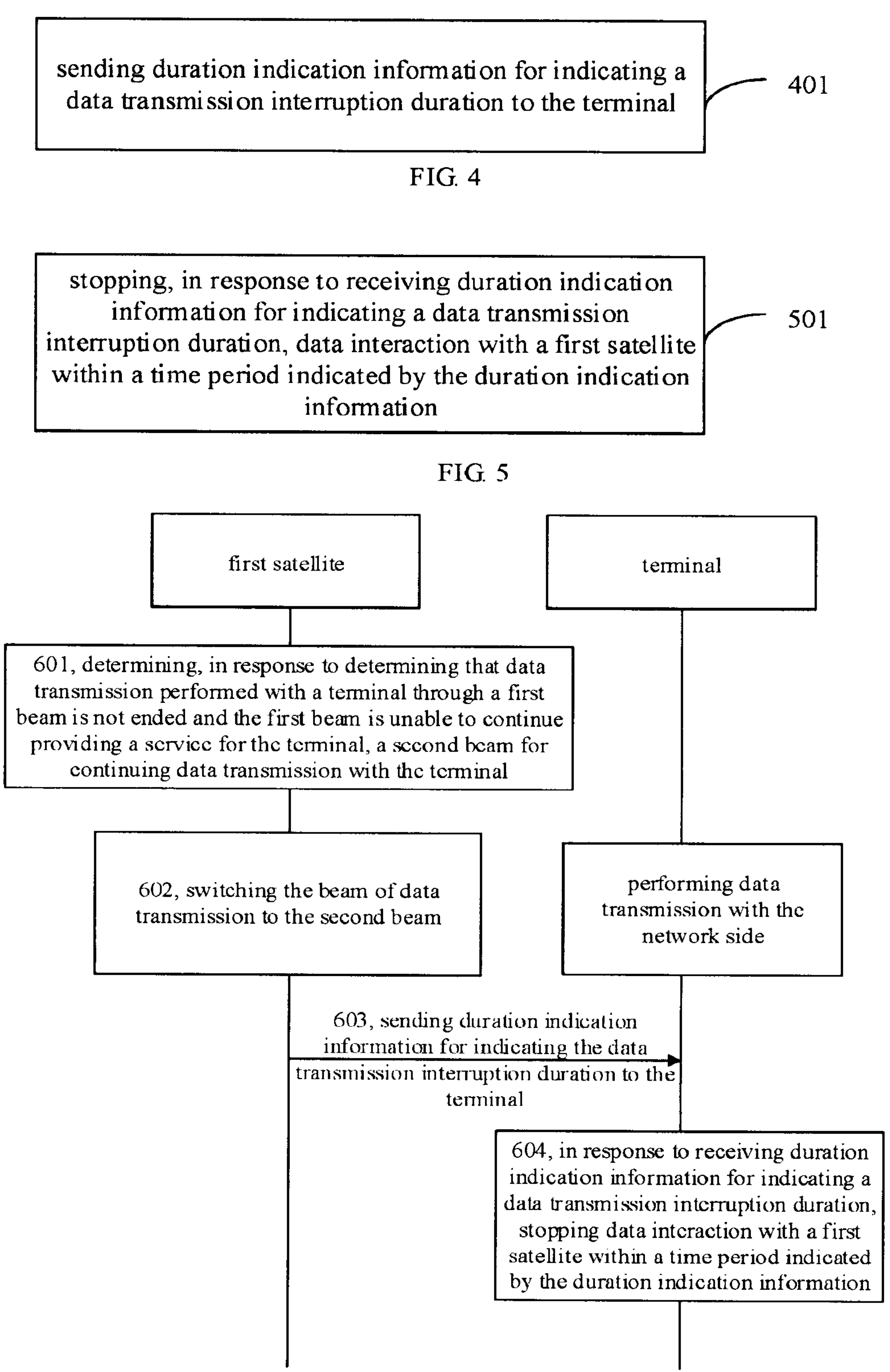
FIG. 4 is a flow diagram of a data transmission method shown according to another example embodiment.
FIG. 5 is a flow diagram of a data transmission method shown according to another example embodiment.
FIG. 6 is a flow diagram of a data transmission method shown according to another example embodiment.

In some embodiments, reference is made to FIG. 4, which is a flowchart of a data transmission method according to an embodiment, including the following step.

In step 401, duration indication information for indicating a data transmission interruption duration is sent to the terminal.

In the embodiment of the present disclosure, if the original base station determines that the data transmission between the network side and the terminal will be interrupted by switching to the second beam, when the original base station is set on the satellite, the first satellite sends the duration indication information for indicating a data transmission interruption duration to the terminal, when the original base station is set on the ground, the duration indication information is sent to the terminal through transfer of the first satellite. The original base station refers to the base station corresponding to the situation that the terminal performs data transmission with the first satellite through the first beam.

The terminal can stop the data interaction with the first satellite within the time period indicated by the duration indication information, so as to avoid the waste of terminal resources caused by the terminal continuing to receive or send data within the time period.

In the embodiment of the present disclosure, if the original base station determines that the terminal has switched to the second beam before the end of the service period in which the first beam provides the service for the terminal, the data transmission between the network side and the terminal will not be interrupted, accordingly, the duration indication information may not be sent to the terminal.

In the above embodiment, when it is determined that switching to the second beam will cause interruption of data transmission with the terminal, the first satellite can send the duration indication information to the terminal, or the duration indication information can be sent to the terminal through transfer of the first satellite, thereby avoiding the waste of terminal resources caused by the terminal continuing to receive or send data in the time period, which has high availability.

The embodiment of the present disclosure provides a data transmission method. Referring to FIG. 5, FIG. 5 is a flowchart of a data transmission method according to an embodiment, which can be applied to a terminal. The terminal includes, but not limited to, a terminal supporting repetitive data transmission, such as an NB-IoT (Narrow Band Internet of Things) terminal, the method can include the following step.

In step 501, in response to receiving duration indication information for indicating a data transmission interruption duration, data interaction with a first satellite is stopped within a time period indicated by the duration indication information.

In the embodiment of the present disclosure, the beam switching is transparent to the terminal. That is, the terminal always considers the network side to be accessible, and can send or receive data with the network side according to the base station configuration information or scheduling transmission manner received in advance. The base station configuration information or scheduling transmission manner may be provided by the original base station. The original base station refers to the base station corresponding to the situation that the terminal performs data transmission with the first satellite through the first beam.

In another example, the terminal may also perform data transmission with the network side based on the new base station configuration information or the new scheduling transmission manner newly received, which is not limited by the present disclosure.

When the original base station determines that switching to the second beam will cause data transmission interruption with the terminal, the first satellite can send the duration indication information to the terminal, and the terminal stops data interaction with the first satellite within the time period indicated by the duration indication information. Or the duration indication information is sent to the terminal through transfer of the first satellite, and the terminal stops data interaction with the first satellite within the time period.

In the above embodiment, the terminal can stop data interaction with the first satellite within the time period indicated by the duration indication information, thereby avoiding wasting terminal resources and having high availability.

In some embodiments, reference is made to FIG. 6, which is a flowchart of a data transmission method according to an embodiment, the method may include the following steps.

In step 601, in response to determining that data transmission performed with a terminal through a first beam is not ended and the first beam is unable to continue providing a service for the terminal, the first satellite determines a second beam for continuing data transmission with the terminal. The second beam is a beam from the first satellite and different from the first beam, or the second beam is a beam from a second satellite.

In step 602, the first satellite switches the beam of data transmission to the second beam.

In Step 603, the first satellite sends duration indication information for indicating the data transmission interruption duration to the terminal.

In the embodiment of the present disclosure, the original base station can send the duration indication information to the terminal when it is determined that the data transmission with the terminal will be interrupted.

In one example, if the original base station is set on the satellite, the first satellite directly sends the duration indication information to the terminal.

In another example, the original base station is set on the ground, and the original base station can send the duration indication information to the terminal through transfer of the first satellite.

In step 604, in response to receiving duration indication information for indicating a data transmission interruption duration, the terminal stops data interaction with a first satellite within a time period indicated by the duration indication information.

In the above embodiment, the terminal always considers the network side to be accessible, and can perform data transmission with the network side according to the base station configuration information or scheduling transmission manner received in advance. Or, the terminal may also perform data transmission with the network side based on the new base station configuration information or the new scheduling transmission manner newly received.

In the above embodiment, the first satellite may also send data information of data to be transmitted (not shown in FIG. 6) in the case that the second beam comes from the second satellite. The data to be transmitted is data needed to be transmitted in a case that the second satellite continues data transmission with the terminal.

In the above embodiment, the first satellite can determine a second beam to continue data transmission with the terminal under the condition that the data transmission with the terminal through the first beam is not ended but the first beam is unable to continue providing a service for the terminal, so as to switch to the second beam. In the satellite communication system, the reliability of data transmission is ensured. In addition to the above-mentioned first scheme, the present disclosure also provides a second scheme, the satellite informs the terminal side of a new service beam, and the terminal accesses the new service beam.

The embodiment of the present disclosure provides a data transmission method. Referring to FIG. 7, FIG. 7 is a flowchart of a data transmission method according to an embodiment, which can be applied to a first satellite. The method can include the following step.

In step 701, in response to determining that data transmission performed with the terminal through a first beam is not ended and the first beam is unable to continue providing a service for the terminal, target indication information is sent to a terminal.

The target indication information is used for indicating the terminal to access a second beam. The second beam is a beam from the first satellite and different from the first beam, or the second beam is a beam from a second satellite. In the above embodiment, the first satellite can send the target indication information to the terminal to instruct the terminal to access the second beam, so as to continue the data transmission under the condition that the data transmission with the terminal through the first beam is not ended but the first beam is unable to continue providing a service for the terminal. In the satellite communication system, the reliability of data transmission is also ensured. In the embodiment of the present disclosure, the terminal accessing the second beam means that the terminal communicates with the network side device through the second beam.

In some embodiments, reference is made to FIG. 8, which is a flowchart of a data transmission method according to an embodiment, the method may include the following step.

In step 801, association information is sent to the terminal.

In the embodiment of the present disclosure, the association information includes but is not limited to at least one of the following: access configuration information of the terminal accessing the second beam, a first transmission parameter for continuing data transmission after accessing the second beam, duration indication information for indicating a data transmission interruption duration.

In the embodiment of the present disclosure, when the original base station is set on the ground, the original base station can send the association information to the first satellite through high-level signaling, including but not limited to RRC (Radio Resource Control) signaling, and MAC (Media Access Control Address) CE (Control Element) signaling, and the first satellite can then send the association information to the terminal. Or, the original base station can send the association information to the first satellite through physical layer signaling, and the first satellite can then send it to the terminal. The original base station refers to the base station corresponding to the situation that the terminal performs data transmission with the first satellite.

When the original base station is set on the satellite, the first satellite can send the association information to the terminal through high-level signaling or physical-level signaling.

In the above embodiment, the first satellite can send the association information to the terminal, so that the terminal can access the second beam to continue data transmission, and the availability is high.

In some embodiments, the association information includes at least one of the following: access configuration information for accessing the second beam; a first transmission parameter for continuing data transmission after accessing the second beam; or duration indication information for indicating a data transmission interruption duration.

The access configuration information includes, but is not limited to, identification information of the second beam, pilot configuration information of accessing the second beam, preamble sequence information of accessing the second beam by the terminal, time-frequency resource information used by accessing the second beam by the terminal, and the like.

Alternatively, in the case where the second beam comes from the second satellite, the access configuration information may include, but is not limited to, identification information of the second satellite, pilot configuration information for accessing the second satellite, preamble sequence information for accessing the second satellite by the terminal, time-frequency resource information used by the terminal for accessing the second satellite, and the like.

Alternatively, in the case where the second beam is from the second satellite, the access configuration information may include but not limited to identification information of the second satellite, identification information of the second beam, pilot configuration information for accessing the second satellite, pilot information for accessing the second beam, preamble sequence information for accessing the second satellite by the terminal, preamble sequence information for accessing the second beam by the terminal, time-frequency resource information used for accessing the second satellite by the terminal, time-frequency resource information used for accessing the second beam by the terminal, etc.

The first transmission parameter includes but not limited to the required time-frequency resources, transmission times and other transmission parameters when the terminal continues data transmission after accessing the second beam. In the above embodiment, the first satellite can send the association information to the terminal, so that the terminal can access the second beam, thereby continuing data transmission, and the availability is high.

Referring to FIG. 9, which is a flowchart of a data transmission method according to an embodiment, which may be applied to a terminal. The terminal includes, but not limited to, a terminal supporting repetitive data transmission, such as an NB-IoT terminal. The method may include the following steps.

In step 901, in response to determining that data transmission performed with a first satellite through a first beam is not ended and receiving target indication information sent by the first satellite, a second beam is accessed based on the target indication information. In step 902, data transmission is continued through the second beam.

The second beam is a beam from the first satellite and different from the first beam, or the second beam is a beam from a second satellite.

In the above embodiment, the terminal can access the second beam according to the instruction of the first satellite, so as to continue data transmission through the second beam. In the satellite communication system, the reliability of data transmission is also ensured.

In some embodiments, reference is made to FIG. 10, which is a flowchart of a data transmission method according to an embodiment, the method may include the following step.

In step 1001, association information sent by the first satellite is received.

The association information includes at least one of: access configuration information for accessing the second beam; a first transmission parameter for continuing data transmission after accessing the second beam; or duration indication information for indicating a data transmission interruption duration.

The access configuration information includes, but is not limited to, identification information of the second beam and/or the second satellite, pilot configuration information of accessing the second beam and/or the second satellite, preamble sequence information of accessing the second beam and/or the second satellite by the terminal, time-frequency resource information used by accessing the second beam and/or the second satellite by the terminal, and the like. The terminal can access the second beam according to the access configuration information.

The first transmission parameter includes but not limited to the required time-frequency resources, transmission times and other transmission parameters when the terminal continues data transmission after accessing the second beam. According to the first transmission parameter, the terminal can continue data transmission after accessing the second beam.

Based on the duration indication information, the terminal may stop data interaction with the first satellite, and/or complete the process of accessing the second beam, etc., which will be further described in later embodiments.

In the above embodiment, the terminal can receive the association information sent by the first satellite, thereby executing corresponding operations, including but not limited to accessing the second beam, continuing data transmission after accessing the second beam, stopping data interaction with the first satellite, etc., with simple implementation and high availability.

Figures 11, 12, 13:
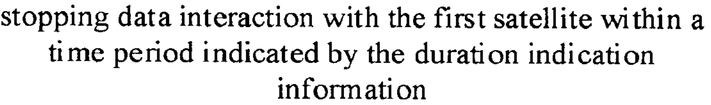
FIG. 11 is a flow diagram of a data transmission method shown according to another example embodiment.
FIG. 12 is a flow diagram of a data transmission method shown according to another example embodiment.
FIG. 13 is a flow diagram of a data transmission method shown according to another example embodiment.

In some embodiments, reference is made to FIG. 11, which is a flowchart of a data transmission method according to an embodiment, the method may include the following step.

In step 1101, data interaction with the first satellite is stopped within a time period indicated by the duration indication information.

In the above embodiment, the terminal can stop data interaction with the first satellite within the time period indicated by the duration indication information, thereby avoiding wasting terminal resources and having high availability.

In some embodiments, reference is made to FIG. 12, which is a flowchart of a data transmission method according to an embodiment, the method may include the following step.

In step 1201, the second beam is accessed within a time period indicated by the duration indication information.

In the embodiment of the present disclosure, the terminal can complete the related operation of accessing the second beam based on the access configuration information within the time period indicated by the duration indication information, so as to continue the data transmission after the end of the time period.

In the above embodiment, the terminal can access the second beam within a time period indicated by the duration indication information. In the satellite communication system, the reliability of data transmission is ensured.

In some embodiments, reference is made to FIG. 13, which is a flowchart of a data transmission method according to an embodiment, the method may include the following steps.

In step 1301, a second transmission parameter sent by a second satellite corresponding to the second beam is received.

In an embodiment of the present disclosure, when the second beam comes from a second satellite, the second transmission parameter may be sent to the terminal by the second satellite.

In step 1302, data transmission is continued through the second beam based on the second transmission parameter.

In the above embodiment, the terminal can continue data transmission through the second beam according to the second transmission parameter sent by the second satellite, thus ensuring the reliability of data transmission in the satellite communication system.

Figure 14:
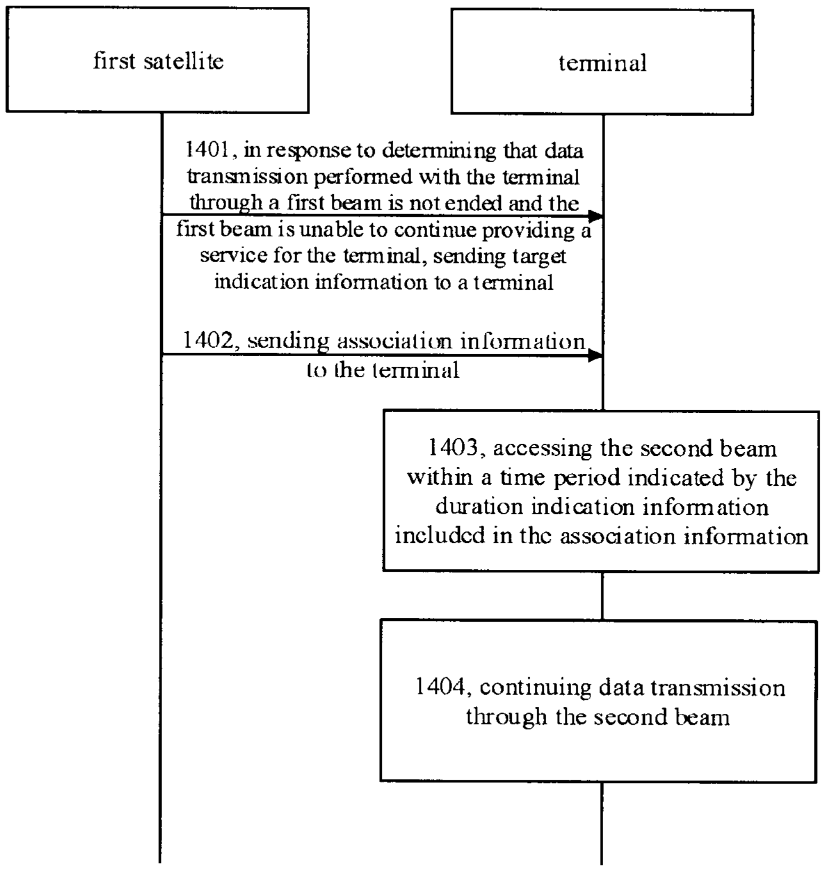
FIG. 14 is a flow diagram of a data transmission method shown according to another example embodiment.

In some embodiments, reference is made to FIG. 14, which is a flowchart of a data transmission method according to an embodiment. The method may include the following steps.

In step 1401, in response to determining that data transmission performed with the terminal through a first beam is not ended and the first beam is unable to continue providing a service for the terminal, the first satellite sends target indication information to a terminal.

In step 1402, the first satellite sends association information to the terminal.

In step 1403, the terminal accesses the second beam within a time period indicated by the duration indication information included in the association information.

The second beam is a beam from the first satellite and different from the first beam, or the second beam is a beam from a second satellite.

In step 1404, the terminal continues data transmission through the second beam.

In the above embodiment, the first satellite can send the target indication information to the terminal to instruct the terminal to access the second beam, so as to continue the data transmission with the terminal through the second beam under the condition that the data transmission with the terminal through the first beam is not ended but the first beam is unable to continue providing a service for the terminal. In the satellite communication system, the reliability of data transmission is also ensured.

In the above two data transmission schemes, the terminal needs to continue data transmission through the second beam. In addition to the above two data transmission schemes, the present disclosure also provides a third scheme, which does not need to switch to other beams of the same satellite or beams of different satellites to continue data transmission, but allows the terminal to complete data transmission within the target time period.

Figure 15:
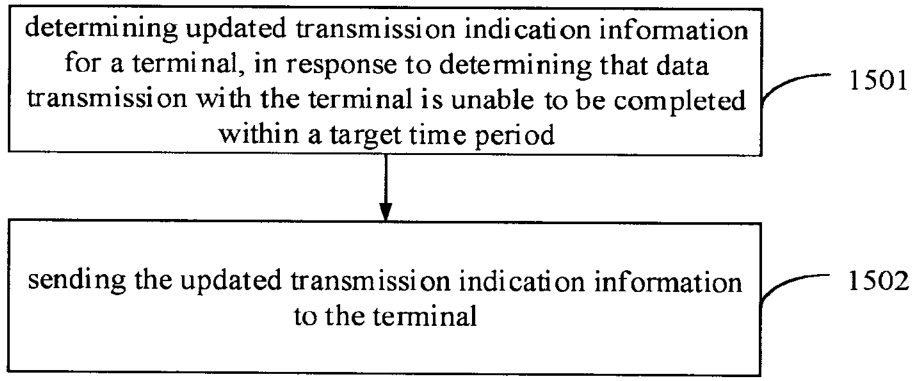
FIG. 15 is a flow diagram of a data transmission method shown according to another example embodiment.

Referring to FIG. 15, FIG. 15 is a flowchart of a data transmission method according to an embodiment, which may be applied to a first satellite, and the method may include the following steps.

In step 1501, in response to determining that data transmission with the terminal is unable to be completed within a target time period, updated transmission indication information is determined for a terminal.

In the embodiment of the present disclosure, the target time period is a time period for providing a service for the terminal through the first beam, and the updated transmission indication information is used for the terminal to complete data transmission within the target time period.

In step 1502, the updated transmission indication information is sent to the terminal.

In the above embodiment, if the first satellite determines that the data transmission with the terminal cannot be completed in the target time period when the first beam provides a service for the terminal, the first satellite can determine the updated transmission indication information for the terminal and send it to the terminal. Based on the updated transmission indication information, the terminal continues the data transmission with the first satellite through the first beam, thereby enabling the terminal to complete the data transmission in the target time period, without accessing other beams of the same satellite or beams of different satellites. In the satellite communication system, the reliability of data transmission is also ensured.

In some embodiments, the updated transmission indication information includes, but is not limited to, at least one of the following: updated terminal power information, updated resource location information, updated modulation coding strategy, and updated number of repetitive transmission.

In an example, the updated terminal power information may indicate a higher terminal power. For example, the terminal performs data transmission through the power value of P1 previously, and the updated terminal power information indicates that the terminal performs data transmission through the power value of P2, P2>P1.

In an example, the updated resource location information may indicate more data transmission resource locations for the terminal. For example, the terminal previously performs data transmission at time-frequency resource locations n1 and n2, and the updated resource location information instructs the terminal to perform data transmission at time-frequency resources n1, n2 and n3.

In an example, the updated adjusted encoding measurement may instruct the terminal to encode the transmitted data in accordance with a more efficient MCS (Modulation and Coding Scheme).

In an example, the updated number of repetitive transmission may indicate a smaller number of repetitive transmission. For example, the number of repetitive transmission of the terminal previously is 1000 times, and the updated number of repetitive transmission is 600 times.

For example, the first satellite determines that the terminal repeatedly transmits a certain data packet for a transmission time period of 10 minutes, but the target time period for the first satellite to provide a service for the terminal through the first beam is less than 10 minutes. The first satellite can determine the updated transmission indication information for the terminal and send it to the terminal, so as to complete the repetitive transmission of the data packet within the target time period.

In the above embodiment, the first satellite ensures that the terminal can complete data transmission within the target time period by determining the updated transmission indication information, without switching to the second beam to continue data transmission, which also ensures the reliability of data transmission in the satellite communication system.

The embodiment of the present disclosure provides a data transmission method, with reference to FIG. 16, which is a flowchart of a data transmission method according to an embodiment and may be applied to a terminal. The terminal includes, but not limited to, a terminal supporting repetitive data transmission, such as an NB-IoT terminal. The method may include the following step.

In step 1601, in response to determining that data transmission performed with a first satellite through a first beam is not ended and receiving updated transmission indication information sent by the first satellite, data transmission with the first satellite through the first beam is continued based on the updated transmission indication information.

The updated transmission indication information is used for the terminal to complete data transmission within a target time period, and the target time period is a time period that the first satellite provides a service for the terminal through the first beam.

In the above embodiment, the terminal does not continue data transmission through the second beam, but can complete the data transmission through the first beam in the target time period, thus saving the network side resources and ensuring the reliability of the data transmission in the satellite communication system.

In some embodiments, the updated transmission indication information includes at least one of the following: updated terminal power information, updated resource location information, updated modulation coding strategy, and updated number of repetitive transmission.

In some embodiments, reference is made to FIG. 17, which is a flowchart of a data transmission method according to an embodiment, the method may include the following steps.

In step 1701, the first satellite determines updated transmission indication information for a terminal, in response to determining that data transmission with the terminal is unable to be completed within a target time period.

The target time period is a time period for providing a service for the terminal through the first beam, and the updated transmission indication information is used for the terminal to complete data transmission within the target time period.

In step 1702, the first satellite sends the updated transmission indication information to the terminal.

In step 1703, the terminal continues data transmission with the first satellite through the first beam based on the updated transmission indication information.

In the above embodiment, the terminal does not continue data transmission through the second beam, but can complete the data transmission through the first beam in the target time period, thus saving the network side resources and ensuring the reliability of the data transmission in the satellite communication system.

Corresponding to the embodiments of the application function realization method, the present disclosure also provides embodiments of the application function realization apparatus.

Referring to FIG. 18, FIG. 18 is a block diagram of a data transmission apparatus according to an example embodiment. The apparatus is applied to a first satellite and includes:

a first determination module 1810 configured to determine, in response to determining that data transmission performed with a terminal through a first beam is not ended and the first beam is unable to continue providing a service for the terminal, a second beam for continuing data transmission with the terminal; and a switching module 1820 configured to switch to the second beam.

The second beam is a beam from the first satellite and different from the first beam, or the second beam is a beam from a second satellite.

The second beam is a beam from a second satellite, the apparatus further includes:

a third sending module configured to send data information of data to be transmitted, wherein the data to be transmitted is data needed to be transmitted in a case that the second satellite continues data transmission with the terminal.

The third sending module includes a first sending submodule configured to send the data information to the second satellite or a second sending sub-module configured to send the data information to a ground station.

The apparatus further includes a fourth sending module configured to send duration indication information for indicating a data transmission interruption duration to the terminal.

Figure 19:
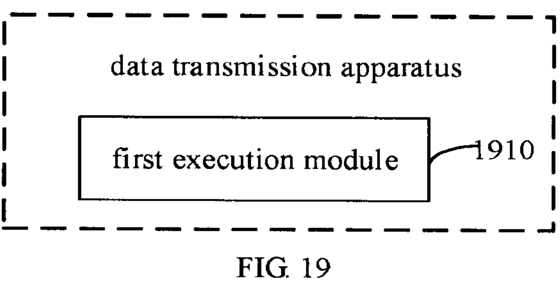
FIG. 19 is a block diagram of a data transmission apparatus shown according to another example embodiment.

Referring to FIG. 19, FIG. 19 is a block diagram of a data transmission apparatus according to an example embodiment. The apparatus is applied to a terminal and includes a first execution module 1910 configured to stop, in response to receiving duration indication information for indicating a data transmission interruption duration, data interaction with a first satellite within a time period indicated by the duration indication information.

Figure 20:
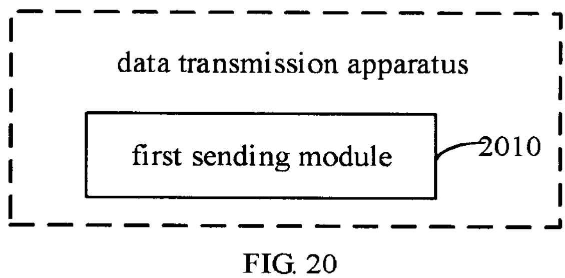
FIG. 20 is a block diagram of a data transmission apparatus shown according to an example embodiment.

Referring to FIG. 20, FIG. 20 is a block diagram of a data transmission apparatus according to an example embodiment. The apparatus is applied to a first satellite and includes a first sending module 2010 configured to send target indication information to a terminal, in response to determining that data transmission performed with the terminal through a first beam is not ended and the first beam is unable to continue providing a service for the terminal, wherein the target indication information is used for indicating the terminal to access a second beam.

The second beam is a beam from the first satellite and different from the first beam, or the second beam is a beam from a second satellite.

The apparatus further includes a fourth sending module configured to send association information to the terminal.

The association information includes at least one of access configuration information for accessing the second beam, a first transmission parameter for continuing data transmission after accessing the second beam, or duration indication information for indicating a data transmission interruption duration.

Figure 21:
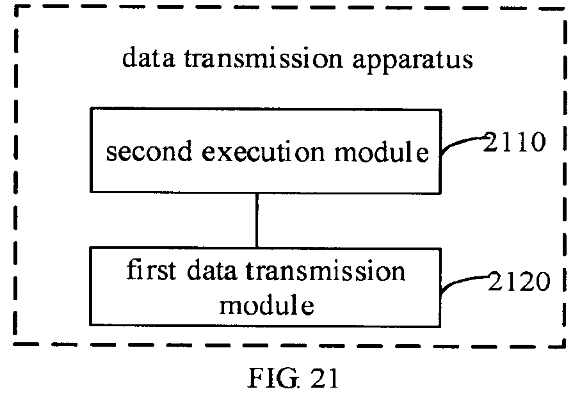
FIG. 21 is a block diagram of a data transmission apparatus shown according to another example embodiment.

Referring to FIG. 21, FIG. 21 is a block diagram of a data transmission apparatus according to an example embodiment. The apparatus is applied to a terminal and includes:

a second execution module 2110 configured to access, in response to determining that data transmission performed with a first satellite through a first beam is not ended and receiving target indication information sent by the first satellite, a second beam based on the target indication information, and a first data transmission module 2120 configured to continue data transmission through the second beam.

The second beam is a beam from the first satellite and different from the first beam, or the second beam is a beam from a second satellite.

The apparatus further includes a first receiving module configured to receive association information sent by the first satellite.

The association information includes at least one of access configuration information for accessing the second beam, a first transmission parameter for continuing data transmission after accessing the second beam, or duration indication information for indicating a data transmission interruption duration.

The apparatus further includes a third execution module configured to stop data interaction with the first satellite within a time period indicated by the duration indication information.

The apparatus further includes a fourth execution module configured to access the second beam within a time period indicated by the duration indication information.

The apparatus further includes a second receiving module configured to receive a second transmission parameter sent by a second satellite corresponding to the second beam;

the first data transmission module includes a data transmission sub-module configured to continue data transmission through the second beam based on the second transmission parameter.

Figure 22:
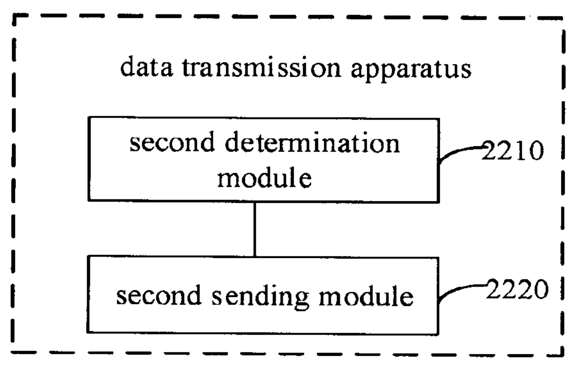
FIG. 22 is a block diagram of a data transmission apparatus shown according to an example embodiment.

Referring to FIG. 22, which is a block diagram of a data transmission apparatus illustrated according to an example embodiment. The data transmission apparatus is applied to a first satellite and includes a second determination module 2210 configured to determine updated transmission indication information for a terminal, in response to determining that data transmission with the terminal is unable to be completed within a target time period, wherein the target time period is a time period for providing a service for the terminal through the first beam, and the updated transmission indication information is used for the terminal to complete data transmission within the target time period; and a second sending module 2220 configured to send the updated transmission indication information to the terminal.

The updated transmission indication information includes at least one of updated terminal power information, updated resource location information, updated modulation coding strategy, and updated number of repetitive transmission.

Figures 23, 24:
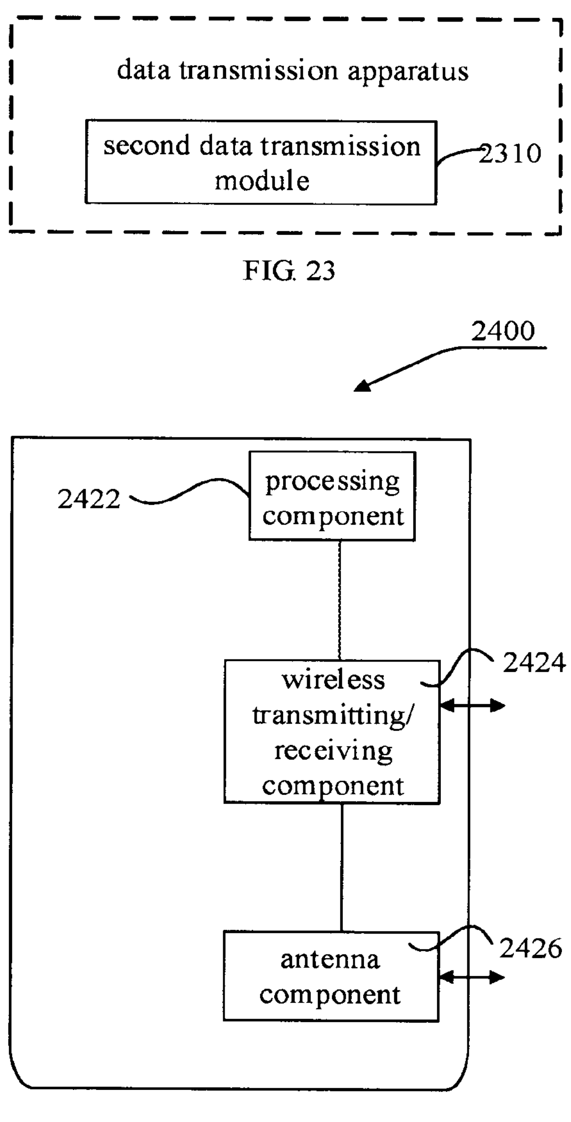
FIG. 23 is a block diagram of a data transmission apparatus shown according to another example embodiment.
FIG. 24 is a schematic diagram of a structure of a data transmission apparatus according to an example embodiment of the present disclosure.

Referring to FIG. 23, FIG. 23 is a block diagram of a data transmission apparatus. The apparatus is applied to a terminal and includes a second data transmission module 2310 configured to continue, in response to determining that data transmission performed with a first satellite through a first beam is not ended and receiving updated transmission indication information sent by the first satellite, data transmission with the first satellite through the first beam based on the updated transmission indication information, wherein the updated transmission indication information is used for the terminal to complete data transmission within a target time period, and the target time period is a time period that the first satellite provides a service for the terminal through the first beam.

The updated transmission indication information includes at least one of updated terminal power information, updated resource location information, updated modulation coding strategy, and updated number of repetitive transmission.

For the embodiments of the apparatus, since they substantially correspond to the embodiments of the method, reference can be made to the description of the embodiments of the method. The above-described embodiments of the apparatus are merely schematic, wherein the above-described units illustrated as separate components may or may not be physically separated, and the components displayed as units may or may not be physical units, i.e. they may be located in one place, or may also be distributed over a plurality of network elements. Some or all of the modules can be selected according to actual needs to achieve the purpose of the disclosed scheme. Those of ordinary skill in the art will be able to understand practice without creative effort.

Correspondingly, the present disclosure also provides a computer-readable storage medium, wherein the storage medium stores a computer program for performing any of the data transmission methods at the first satellite side.

Correspondingly, the present disclosure also provides a computer-readable storage medium, wherein the storage medium stores a computer program for performing any of the data transmission methods at the terminal side.

Correspondingly, the disclosure also provides a data transmission apparatus, including a processor and a memory for storing instructions executable by the processor. The processor is configured to perform any of the data transmission methods at the first satellite side.

FIG. 24 is a schematic diagram of a structure of a data transmission apparatus 2400 according to an example embodiment. The apparatus 2400 may be provided as a satellite. Referring to FIG. 24, the apparatus 2400 includes a processing component 2422 which may further include one or more processors, a wireless transmitting/receiving component 2424, an antenna component 2426, and a wireless interface-specific signal processing portion.

One of the processors in the processing component 2422 may be configured to perform any of the data transmission methods at the first satellite side.

Correspondingly, the disclosure also provides a data transmission apparatus, including a processor and a memory for storing instructions executable by the processor. The processor is configured to perform any of the data transmission methods at the terminal side.

The technical solution provided by the embodiment of the present disclosure may include the following beneficial effects.

In the embodiment of the present disclosure, the first satellite can determine a second beam to continue data transmission with the terminal under the condition that the data transmission with the terminal through the first beam is not ended but the first beam is unable to continue providing a service for the terminal, so as to switch to the second beam. In the satellite communication system, the reliability of data transmission is ensured.

In the embodiment of the present disclosure, the second beam may be a beam from the first satellite and different from the first beam, or the second beam may be a beam from a second satellite, thereby realizing the purpose of continuing data transmission with the terminal, and ensuring the reliability of data transmission in a satellite communication system.

In the embodiment of the present disclosure, the first satellite can send the target indication information to the terminal to instruct the terminal to access the second beam, so as to continue the data transmission under the condition that the data transmission with the terminal through the first beam is not ended but the first beam is unable to continue providing a service for the terminal. In the satellite communication system, the reliability of data transmission is also ensured.

In the embodiment of the present disclosure, if the first satellite determines that the data transmission with the terminal cannot be completed in the target time period when the first beam provides a service for the terminal, the first satellite can determine the updated transmission indication information for the terminal and send it to the terminal. Based on the updated transmission indication information, the terminal continues the data transmission with the first satellite through the first beam, thereby enabling the terminal to complete the data transmission in the target time period, without accessing the beams of other satellites or other beams of the same satellite. In the satellite communication system, the reliability of data transmission is also ensured.

The technical solutions of the present disclosure are as follows.

According to a first aspect of the present disclosure, there is provided a data transmission method, applied to a first satellite, including determining, in response to determining that data transmission performed with a terminal through a first beam is not ended and the first beam is unable to continue providing a service for the terminal, a second beam for continuing data transmission with the terminal, and switching to the second beam.

In an embodiment, the second beam is a beam from the first satellite and different from the first beam, or the second beam is a beam from a second satellite.

In an embodiment, the second beam is a beam from a second satellite, the method further includes sending data information of data to be transmitted, wherein the data to be transmitted is data needed to be transmitted in a case that the second satellite continues data transmission with the terminal.

In an embodiment, sending data information of data to be transmitted includes sending the data information to the second satellite, or sending the data information to a ground station.

In an embodiment, the method further includes sending duration indication information for indicating a data transmission interruption duration to the terminal.

According to a second aspect of the present disclosure, there is provided a data transmission method, applied to a terminal, including stopping, in response to receiving duration indication information for indicating a data transmission interruption duration, data interaction with a first satellite within a time period indicated by the duration indication information.

According to a third aspect of the present disclosure, there is provided a data transmission method, applied to a first satellite, including sending target indication information to a terminal, in response to determining that data transmission performed with the terminal through a first beam is not ended and the first beam is unable to continue providing a service for the terminal, wherein the target indication information is used for indicating the terminal to access a second beam.

In an embodiment, the second beam is a beam from the first satellite and different from the first beam, or the second beam is a beam from a second satellite.

In an embodiment, the method further includes sending association information to the terminal.

In an embodiment, the association information includes at least one of access configuration information for accessing the second beam, a first transmission parameter for continuing data transmission after accessing the second beam, or duration indication information for indicating a data transmission interruption duration.

According to a fourth aspect of the present disclosure, there is provided a data transmission method, applied to a terminal, including accessing, in response to determining that data transmission performed with a first satellite through a first beam is not ended and receiving target indication information sent by the first satellite, a second beam based on the target indication information, and continuing data transmission through the second beam.

In an embodiment, the second beam is a beam from the first satellite and different from the first beam, or the second beam is a beam from a second satellite.

In an embodiment, the method further includes receiving association information sent by the first satellite.

In an embodiment, the association information includes at least one of:

access configuration information for accessing the second beam;

a first transmission parameter for continuing data transmission after accessing the second beam; or duration indication information for indicating a data transmission interruption duration.

In an embodiment, the method further includes stopping data interaction with the first satellite within a time period indicated by the duration indication information.

In an embodiment, the method further includes accessing the second beam within a time period indicated by the duration indication information.

In an embodiment, the method further includes receiving a second transmission parameter sent by a second satellite corresponding to the second beam, where continuing data transmission through the second beam includes continuing data transmission through the second beam based on the second transmission parameter.

According to a fifth aspect of the present disclosure, there is provided a data transmission method, applied to a first satellite, including determining updated transmission indication information for a terminal, in response to determining that data transmission with the terminal is unable to be completed within a target time period, wherein the target time period is a time period for providing a service for the terminal through the first beam, and the updated transmission indication information is used for the terminal to complete data transmission within the target time period, and sending the updated transmission indication information to the terminal.

In an embodiment, the updated transmission indication information includes at least one of updated terminal power information, updated resource location information, updated modulation coding strategy, and updated number of repetitive transmission.

According to a sixth aspect of the present disclosure, there is provided a data transmission method, applied to a terminal, including continuing, in response to determining that data transmission performed with a first satellite through a first beam is not ended and receiving updated transmission indication information sent by the first satellite, data transmission with the first satellite through the first beam based on the updated transmission indication information, wherein the updated transmission indication information is used for the terminal to complete data transmission within a target time period, and the target time period is a time period that the first satellite provides a service for the terminal through the first beam.

In an embodiment, the updated transmission indication information includes at least one of updated terminal power information, updated resource location information, updated modulation coding strategy, and updated number of repetitive transmission.

According to a seventh aspect of the present disclosure, there is provided a data transmission apparatus, applied to a first satellite, including a first determination module configured to determine, in response to determining that data transmission performed with a terminal through a first beam is not ended and the first beam is unable to continue providing a service for the terminal, a second beam for continuing data transmission with the terminal, and a switching module configured to switch to the second beam.

According to an eighth aspect of the present disclosure, there is provided a data transmission apparatus, applied to a terminal, including a first execution module configured to stop, in response to receiving duration indication information for indicating a data transmission interruption duration, data interaction with a first satellite within a time period indicated by the duration indication information.

According to a ninth aspect of the present disclosure, there is provided a data transmission apparatus, applied to a first satellite, including a first sending module configured to send target indication information to a terminal, in response to determining that data transmission performed with the terminal through a first beam is not ended and the first beam is unable to continue providing a service for the terminal, wherein the target indication information is used for indicating the terminal to access a second beam.

According to a tenth aspect of the present disclosure, there is provided a data transmission apparatus, applied to a terminal, including a second execution module configured to access, in response to determining that data transmission performed with a first satellite through a first beam is not ended and receiving target indication information sent by the first satellite, a second beam based on the target indication information, and a first data transmission module configured to continue data transmission through the second beam.

According to a eleventh aspect of the present disclosure, there is provided a data transmission apparatus, applied to a first satellite, including a second determination module configured to determine updated transmission indication information for a terminal, in response to determining that data transmission with the terminal is unable to be completed within a target time period, wherein the target time period is a time period for providing a service for the terminal through the first beam, and the updated transmission indication information is used for the terminal to complete data transmission within the target time period, and a second sending module configured to send the updated transmission indication information to the terminal.

According to a twelfth aspect of the present disclosure, there is provided a data transmission apparatus, applied to a terminal, including a second data transmission module configured to continue, in response to determining that data transmission performed with a first satellite through a first beam is not ended and receiving updated transmission indication information sent by the first satellite, data transmission with the first satellite through the first beam based on the updated transmission indication information, wherein the updated transmission indication information is used for the terminal to complete data transmission within a target time period, and the target time period is a time period that the first satellite provides a service for the terminal through the first beam.

According to a thirteenth aspect of the present disclosure, there is provided a computer-readable storage medium, wherein the storage medium stores a computer program for performing the data transmission method of any one of the above first aspect, the third aspect or the fifth aspect.

According to a fourteenth aspect of the present disclosure, there is provided a computer-readable storage medium, wherein the storage medium stores a computer program for performing the data transmission method of any one of the above second aspect, the fourth aspect or the sixth aspect.

According to a fifteenth aspect of the present disclosure, there is provided a data transmission apparatus, including a processor and a memory for storing instructions executable by the processor. The processor is configured to perform the data transmission method of any one of the above first aspect, the third aspect or the fifth aspect.

According to a sixteenth aspect of the present disclosure, there is provided a data transmission apparatus, including a processor and a memory for storing instructions executable by the processor. The processor is configured to perform the data transmission method of any one of the above second aspect, the fourth aspect or the sixth aspect.

Figure 25:
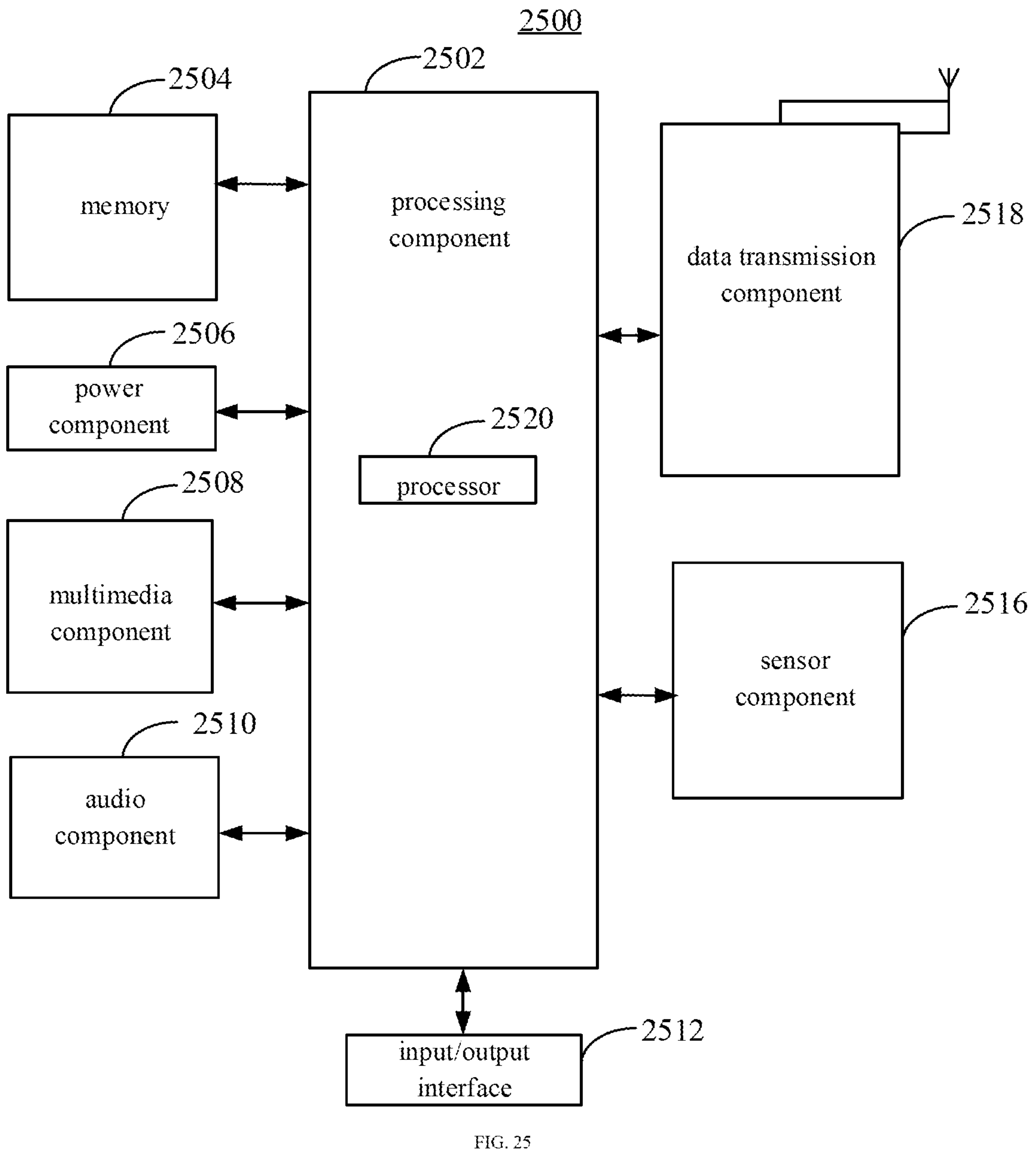
FIG. 25 is a schematic diagram of a structure of a data transmission apparatus according to another example embodiment of the present disclosure.

FIG. 25 is a block diagram of an electronic device 2500 according to an example embodiment. For example, the electronic device 2500 may be a mobile phone, a tablet computer, an e-book reader, a multimedia player, a wearable device, a vehicle terminal, an ipad, a smart TV and other terminals.

Referring to FIG. 25, the electronic device 2500 may include one or more of the following components: a processing component 2502, a memory 2504, a power component 2506, a multimedia component 2508, an audio component 2510, an input/output (I/O) interface 2512, a sensor component 2516, and a data transmission component 2518.

The processing component 2502 typically controls the overall operations of the electronic device 2500, such as the operations associated with display, telephone calls, data transmission, camera operations, and recording operations. The processing component 2502 can include one or more processors 2520 to execute instructions to perform all or part of the steps in the above data transmission methods. Moreover, the processing component 2502 can include one or more modules to facilitate the interaction between the processing component 2502 and other components. For example, the processing component 2502 can include a multimedia module to facilitate the interaction between the multimedia component 2508 and the processing component 2502. As another example, the processing component 2502 can read the executable instructions from the memory to realize the steps of the data transmission methods provided by the above embodiments.

The memory 2504 is configured to store various types of data to support the operation of the electronic device 2500. Examples of such data include instructions for any application or method operated on the electronic device 2500, such as the contact data, the phone book data, messages, pictures, videos, and the like. The memory 2504 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2506 provides power to various components of the electronic device 2500. The power component 2506 can include a power management system, one or more power sources, and other components associated with the generation, management, and distribution of power in the electronic device 2500.

The multimedia component 2508 includes a screen providing an output interface between the electronic device 2500 and the user. In some embodiments, the multimedia component 2508 includes a front camera and/or a rear camera. When the electronic device 2500 is in an operation mode, such as a photographing mode or a video mode, the front camera and/or the rear camera can receive external multimedia data. Each of the front camera and the rear camera may be a fixed optical lens system or have focus and optical zoom capability.

The audio component 2510 is configured to output and/or input an audio signal. For example, the audio component 2510 includes a microphone (MIC) configured to receive an external audio signal when the electronic device 2500 is in an operation mode, such as a call mode, a recording mode, and a voice recognition mode. The received audio signal may be further stored in the memory 2504 or sent via the data transmission component 2518. In some embodiments, the audio component 2510 also includes a speaker for outputting the audio signal.

The I/O interface 2512 provides an interface between the processing component 2502 and peripheral interface modules, such as a keyboard, a click wheel, buttons, and the like. These buttons may include, but not limited to, a home button, a volume button, a starting button, and a locking button.

The sensor component 2516 includes one or more sensors for providing state assessments of various aspects of the electronic device 2500. For example, the sensor component 2516 can detect an open/closed state of the electronic device 2500, relative positioning of components, such as the display and the keypad of the electronic device 2500. The sensor component 2516 can also detect a change in position of one component of the electronic device 2500 or the electronic device 2500, the presence or absence of user contact with the electronic device 2500, an orientation, or an acceleration/deceleration of the electronic device 2500, and a change in temperature of the electronic device 2500. The sensor component 2516 can also include a proximity sensor configured to detect the presence of nearby objects without any physical contact. The sensor component 2516 can also include a light sensor, such as a CMOS or CCD image sensor, configured to use in imaging applications. In some embodiments, the sensor component 2516 can also include an accelerometer sensor, a gyroscope sensor, a magnetic sensor, a pressure sensor, or a temperature sensor.

The data transmission component 2518 is configured to facilitate data transmission between the electronic device 2500 and other devices by wired or wireless manners. The electronic device 2500 can access a wireless network based on any data transmission standard, such as Wi-Fi, 2G, 3G, 4G, 5G or 6G, or a combination thereof. In an example embodiment, the data transmission component 2518 receives broadcast signals or broadcast association information from an external broadcast management system via a broadcast channel. In an example embodiment, the data transmission component 2518 also includes a near field communication (NFC) data transmission module to facilitate short-range data transmission. For example, the NFC module can be implemented based on radio frequency identification (RFID) technology, infrared data association (IrDA) technology, ultra-wideband (UWB) technology, Bluetooth (BT) technology and other technologies.

In an example embodiment, the electronic device 2500 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform any of the data transmission methods at the terminal side.

In an example embodiment, there is also provided a non-transitory computer-readable storage medium including instructions, such as a memory 2504 including instructions executable by the processor 2520 of the electronic device 2500 to perform the above data transmission methods. For example, the non-transitory computer readable storage medium may be a ROM, a random access memory (RAM), a CD-ROM, a magnetic tape, a floppy disc, and an optical data storage device, or the like.

Other implementations of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative only, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A data transmission method, applied to a first satellite, comprising:

determining, in response to determining that data transmission performed with a terminal through a first beam is not ended and the first beam is unable to continue providing a service for the terminal, a second beam for continuing data transmission with the terminal; and switching to the second beam, wherein the second beam is a beam from a second satellite, the method further comprises:

sending data information of data to be transmitted, wherein the data to be transmitted is data needed to be transmitted in a case that the second satellite continues data transmission with the terminal, the method further comprising:

dynamically sending duration indication information for indicating a data transmission interruption duration to the terminal, in response to determining that switching to the second beam causes data transmission interruption with the terminal.

2. The method of claim 1, wherein the second beam is a beam from the first satellite and different from the first beam.

3. The method of claim 1, wherein sending data information of data to be transmitted comprises:

sending the data information to the second satellite; or sending the data information to a ground station.

4. A non-transitory computer-readable storage medium, having computer program instructions stored thereon, wherein the computer program instructions implement steps of the data transmission method according to claim 1 when executed by a processor.

5. A data transmission method, applied to a first satellite, comprising:

sending target indication information to a terminal, in response to determining that data transmission performed with the terminal through a first beam is not ended and the first beam is unable to continue providing a service for the terminal, wherein the target indication information is used for indicating the terminal to access a second beam, wherein the method further comprises:

sending association information to the terminal, wherein the association information comprises duration indication information for indicating a data transmission interruption duration dynamically sent to the terminal in response to determining that switching to the second beam causes data transmission interruption with the terminal.

6. The method of claim 5, wherein the second beam is a beam from the first satellite and different from the first beam, or the second beam is a beam from a second satellite.

7. The method of claim 5, wherein the association information comprises at least one of:

access configuration information for accessing the second beam;

a first transmission parameter for continuing data transmission after accessing the second beam; or duration indication information for indicating a data transmission interruption duration.

8. A data transmission apparatus, applied to a first satellite, comprising:

a processor; and a memory for storing instructions executable by the processor, wherein the processor is configured to perform the data transmission method of claim 5.

9. The apparatus of claim 8, wherein the second beam is a beam from the first satellite and different from the first beam, or the second beam is a beam from a second satellite.

10. The apparatus of claim 8, wherein the association information comprises at least one of:

access configuration information for accessing the second beam;

a first transmission parameter for continuing data transmission after accessing the second beam; or duration indication information for indicating a data transmission interruption duration.

11. A non-transitory computer-readable storage medium, having computer program instructions stored thereon, wherein the computer program instructions implement steps of the data transmission method according to claim 5 when executed by a processor.

12. A data transmission apparatus, applied to a first satellite, comprising:

a processor; and a memory for storing instructions executable by the processor, wherein the processor is configured to:

determine, in response to determining that data transmission performed with a terminal through a first beam is not ended and the first beam is unable to continue providing a service for the terminal, a second beam for continuing data transmission with the terminal; and switch to the second beam, wherein the second beam is a beam from a second satellite, the processor is further configured to:

send data information of data to be transmitted, wherein the data to be transmitted is data needed to be transmitted in a case that the second satellite continues data transmission with the terminal, wherein the processor is further configured to:

dynamically send duration indication information for indicating a data transmission interruption duration to the terminal, in response to determining that switching to the second beam causes data transmission interruption with the terminal.

13. The apparatus of claim 12, wherein the second beam is a beam from the first satellite and different from the first beam.

14. The apparatus of claim 12, wherein the processor is further configured to:

send the data information to the second satellite; or send the data information to a ground station.

* * * * *